(No Model.)  2 Sheets—Sheet 1.
C. E. NICHOLS.
RAILWAY ATTACHMENT FOR BICYCLES.
No. 606,073.  Patented June 21, 1898.
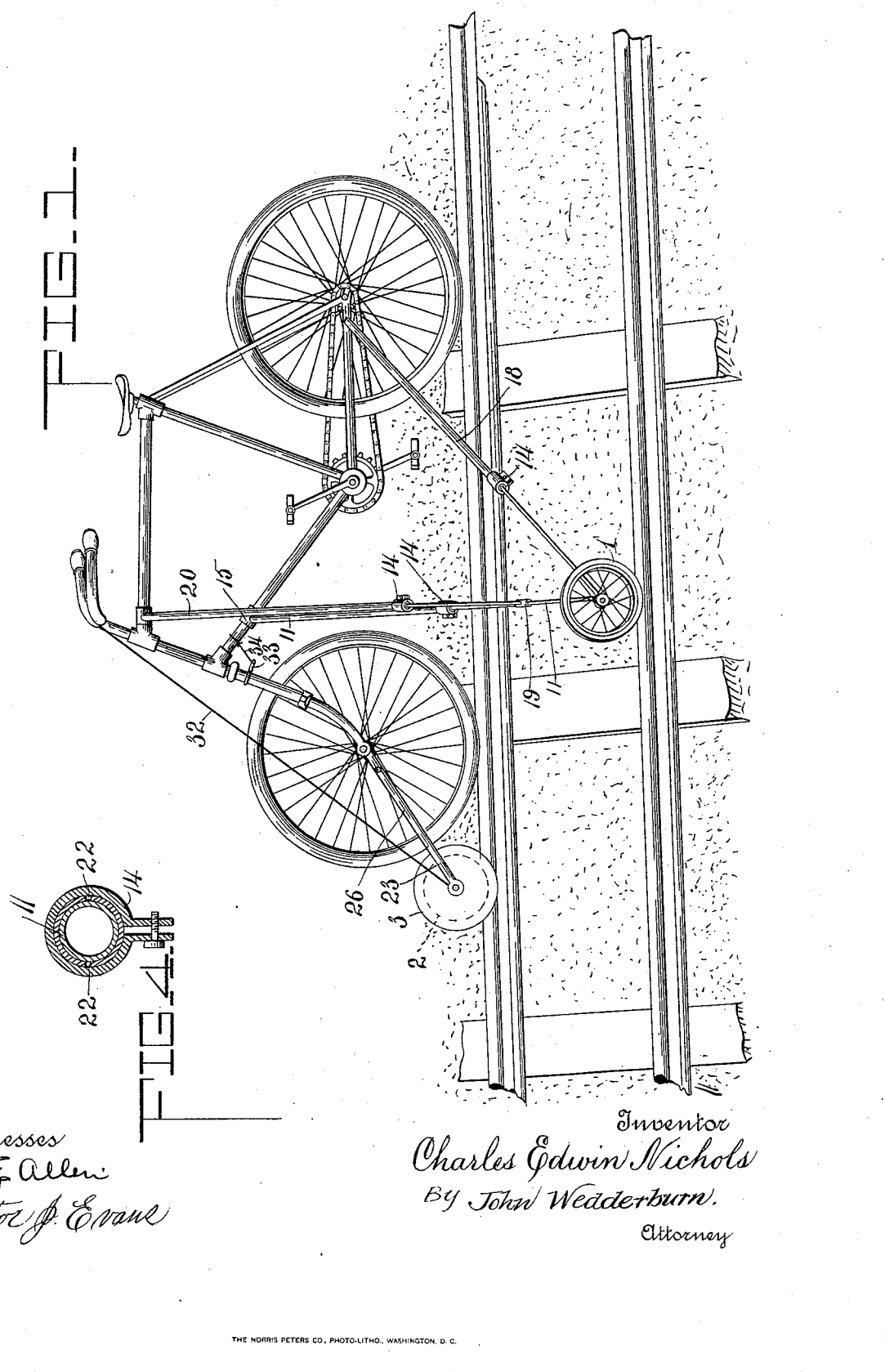
Witnesses
W. F. Allen
Victor J. Evans
Inventor
Charles Edwin Nichols
By John Wedderburn.
Attorney (No Model.) 2 Sheets—Sheet 2.
C. E. NICHOLS.
RAILWAY ATTACHMENT FOR BICYCLES.
No. 606,073. Patented June 21, 1898.
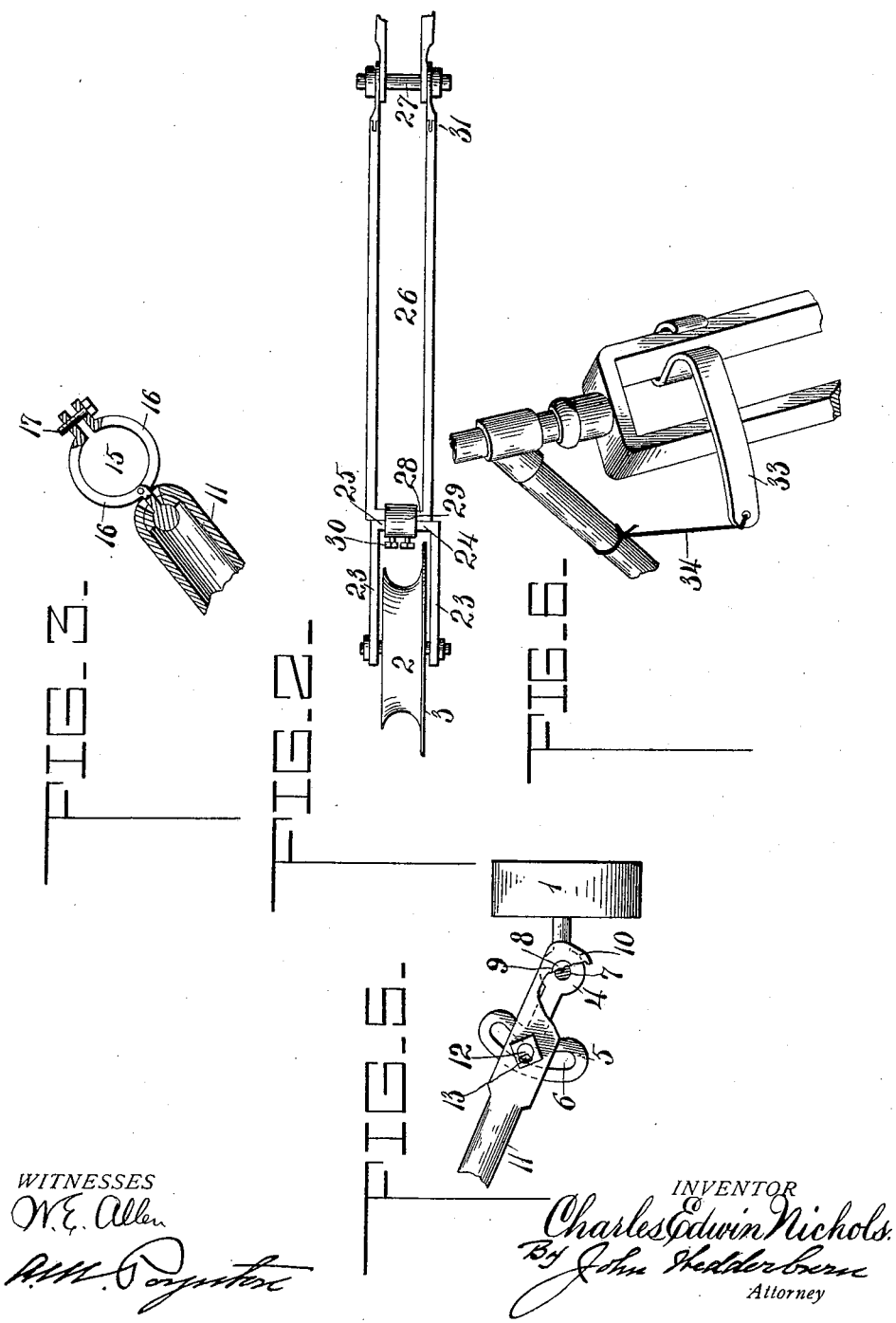

UNITED STATES PATENT OFFICE.

CHARLES EDWIN NICHOLS, OF MILAN, WASHINGTON.

RAILWAY ATTACHMENT FOR BICYCLES.

SPECIFICATION forming part of Letters Patent No. 606,073, dated June 21, 1898.

Application filed February 15, 1897. Serial No. 623,435. (No model.)

*To all whom it may concern:*

Be it known that I, CHARLES EDWIN NICHOLS, a citizen of the United States, residing at Milan, in the county of Spokane and State of Washington, have invented certain new and useful Improvements in Railway Attachments for Bicycles; and I do hereby declare the following to be a full, clear, and exact description of the invention, such as will enable others skilled in the art to which it appertains to make and use the same.

This invention relates to bicycle attachments, and has for its object to provide, in connection with an ordinary safety-bicycle, a plurality of wheels and suitable frames or connections between said wheels and the bicycle-frame whereby the bicycle may be ridden upon railway-rails.

The improved attachment is constructed in a very light manner and is adapted to be folded compactly for facilitating its transportation upon the bicycle.

The detailed objects and advantages of the invention will be pointed out in the course of the ensuing description.

The invention consists in an improved attachment for bicycles embodying certain novel features and details of construction and arrangement of parts, as hereinafter fully described, illustrated in drawings, and pointed out in the claims.

In the accompanying drawings, Figure 1 is a perspective view of a bicycle with the improved attachment applied thereto and showing the same in position upon a railway. Fig. 2 is a detail plan view of that portion of the attachment which is secured to the steering-wheel. Fig. 3 is a detail sectional view showing the manner of connecting the frame of the attachment to the bicycle-frame. Fig. 4 is a detail cross-section through the telescopic ends of the several brace-rods. Fig. 5 is a detail view of the connection between the frame of the wheel and the frame of the attachment. Fig. 6 is a detail perspective view showing the spring which influences the steering-wheel of the bicycle and maintains the same in engagement with the rail.

Similar numerals of reference designate corresponding parts in the several figures of the drawings.

The improved attachment is adapted to be applied to any ordinary safety-bicycle of modern construction, and it comprises, essentially, a balancing-wheel 1 and a guide-wheel 2. Both of said wheels may be constructed with tangent spokes and provided with rubber treads, so as to travel upon the opposite rails of a road-bed, as shown in Fig. 1. The balancing-wheel 1 is constructed without a flange and of considerable width and simply travels upon the head of the rail opposite the rail upon which the machine travels. The guide-wheel 2 is, however, provided at one side with a circumferential flange 3, said flange being adapted to bear against the head of the rail upon which the wheel 2 travels, so as to maintain both wheels of the bicycle in proper position upon the rail. Both of said wheels may also be mounted upon their respective axles by means of ball-bearings, so as to reduce the friction to a minimum.

The balancing-wheel 1 has connected to its axle an adjusting-plate 4, having a segmental portion 5, provided with a curved slot 6, described around an opening 7 as the center, the said opening in the plate 4 being adapted to receive a pivot or bolt 8, which passes through an opening 9 in the outer extremity of the flattened end 10 of one of the brace-rods 11 of the attachment.

12 designates a bolt which passes through the segmental slot 6 and also through an opening 13 in the end of the brace 11, by loosening which the balancing-wheel 1 may be adjusted as to its angle with relation to the frame of the bicycle, thus adapting the attachment as a whole to be properly fitted to bicycles of different sizes and frame construction.

The brace 11 is telescopic, consisting of two members arranged to slide one within another, the inner section being provided with a clamp-collar 14, by tightening which the two sections of the telescopic brace may be held in fixed relation to each other after they have been adjusted properly. The inner section of the brace 11 is provided with a clip 15, which has a ball-and-socket-joint connection with the adjustable end of the brace 11, so that the latter may be turned to any desired angle relatively to the machine-frame. The clip 15 consists of opposite U-shaped portions 16, which are pivotally related, as shown in the drawings, and connected by a clamp bolt or screw 17. The clip 15 is preferably lined upon the inside with some soft material, such as felt, for preventing the marring of the bicycle-frame when the attachment is placed thereon. A similar telescopic brace 18 is interposed between the outer end of the brace 11 and the machine-frame adjacent to the rear axle, the brace 11 connecting with the machine-frame near the head of the machine and upon the reach-bar. The brace 18 is also telescopic, being adjustable like the brace 11 and being connected to the frame by a ball-and-socket joint and clip similar to that above described. Mounted adjustably upon the brace 11 is a clamp-collar 19, and to this collar is pivotally connected the outer end of a third telescopic brace 20, the inner end of which is clipped onto the top run or upper bar of the bicycle-frame, preferably at a point near the head-tube. By means of the construction described the balancing-wheel may be adjusted up or down and backward or forward and also at any desired angle with relation to the bicycle-frame, thus enabling the attachment to be applied to bicycles of various sizes and patterns. Also by the construction described the several members of the frame of the attachment may be uncoupled or may be detached from the machine-frame and compactly folded, and, if desired, secured to the machine-frame for transportation. The outer tube of each telescopic brace is split, as indicated at 22, at that end where the inner tube enters it, so that the clamp-collar 14 may compress the end of the outer tube, so as to cause the same to bind firmly on the inner tube and prevent the relative sliding of the two parts of the brace.

The guide-wheel 2 is journaled between the lower forward ends of the arms 23 of a U-shaped frame 24, the central or connecting portion 25 of which is either square, rectangular, or half-round in cross-sections.

26 designates a second U-shaped frame, the substantially parallel arms of which are provided at their extremities with openings for the reception of the axle 27 of the steering-wheel of the bicycle. The connecting portion 28 of the frame 26 is shaped similarly to the portion 25 of the frame 24, and surrounding said connecting portions is a clamp 29 in the form of a collar, the same being provided with binding-screws 30. This construction adapts the frame 24 to be moved or adjusted laterally with respect to the frame 26 and to be held at any point, the purpose of this construction being to bring the guide-wheel into the proper relation to the rail upon which the bicycle is traveling. By properly adjusting the guide-wheel 2 the steering-wheel of the machine is not only maintained in proper relation to the rail, but the rear or driving wheel of the machine is caused to trail properly behind the steering wheel. The arms or bars of the frame 26 are jointed at points intermediate their ends, as indicated at 31, so that the forward portions of said arms may fold upward. A cord or other flexible connection 32 extends from the end of one of the arms 23 of the frame 24 upward and rearward to the handle-bar of the machine. By means of this cord the guide-wheel is upheld in case the bicycle should slip off the rail and also facilitates the placing of bicycle on a railway, as the guide-wheel may be lifted thereby. When not in use, the guide-wheel 2 may be folded up against the head of the machine and secured in any suitable manner.

33 designates a short leaf-spring which is secured to the steering-fork, near the crown thereof, as shown in Figs. 1 and 6. Adjustably connected to the free end of said spring is a cord or similar device 34, which also connects with the frame of the machine or attachment. By tightening or loosening the cord 34 the tension of the spring 33 may be varied at will, and this spring acts to hold the flange of the guiding-wheel 2 against the head of the rail, thus reducing the liability of the bicycle slipping off the rail.

The flanged guiding-wheel prevents the steering-wheel of the bicycle from passing off the rail, and the rear or driving wheel of the machine is therefore kept upon the rail as it trails behind or follows in the track of the steering-wheel. The balance of the machine is maintained by means of the wheel 1, which travels on the opposite rail.

The attachment is very light, durable, and portable, may be adjusted to machines of different sizes and makes, and may be readily adjusted, folded up, and strapped or otherwise secured to bicycles for transportation. The guide-wheel 2 may be folded against the head of the machine and secured in any manner.

Having thus described my invention, what is claimed as new, and desired to be secure by Letters Patent, is—

1. The combination with a bicycle, of a flanged guiding-wheel located in advance of the steering-wheel of the machine, spaced rods or bars connecting the axles of said wheels and jointed intermediate their ends to admit of the folding of the guiding-wheel, and means on the machine for lifting said guide-wheel, substantially as described.

2. The combination with a bicycle, of a guiding-wheel arranged in advance of the steering-wheel of the machine, spaced rods or bars connecting the axles of said wheels and jointed intermediate their ends, and a cord or flexible connection interposed between said rods or bars and the frame of the machine, whereby the guiding-wheel may be lifted, substantially as described.

3. The combination with a bicycle, of a guiding-wheel arranged in advance of the steering-wheel of the machine, and provision for adjusting the said guiding-wheel laterally, substantially as described.

4. The combination with a bicycle, of a frame extending to a point in advance of the steering-wheel, and a guiding-wheel adjustably mounted on said frame and made laterally movable, substantially as described.

5. The combination with a bicycle, of a frame projecting in advance of the steering-wheel, a guiding-wheel carried by said frame, and means for adjusting said guiding-wheel laterally, substantially as described.

6. The combination with a bicycle, of a frame projecting in advance of the steering-wheel and having a connecting portion or cross-bar, a guiding-wheel, a frame in which said guiding-wheel is journaled having a connecting portion or cross-bar, and a clamp connecting the cross-bars of said frames and adapting the same to be adjusted relatively to each other for permitting the guiding-wheel to be moved laterally or across the plane of the steering-wheel of the bicycle, substantially as and for the purpose specified.

7. The combination with a bicycle, of a balancing-frame extending upon one side thereof, a balancing-wheel journaled on said frame and means whereby said wheel may be tilted vertically, substantially as described.

8. The combination with a bicycle, of an adjustable and extensible frame secured thereto and projecting laterally therefrom, a balancing-wheel, and a plate carrying the axle of said wheel, said plate being pivotally connected to the frame and comprising a segmental slotted portion adapted to receive a clamping-bolt, whereby said plate may be adjustable as to its angle for correspondingly changing the angle of the balancing-wheel, substantially as described.

9. The combination with a bicycle, of an adjustable and extensible frame connected thereto and projecting laterally therefrom, said frame comprising a plurality of bars provided at their inner ends with clips for engaging the frame of the bicycle, said clips being connected to their respective bars or braces by means of ball-and-socket joints, substantially as described.

10. The combination with a bicycle, of a balancing-wheel arranged at one side of the machine-frame, diverging braces connecting the axle of said balancing-wheel with the machine-frame, and detachably connected to the latter at the rear axle and upon the reach-bar of the machine-frame, and a brace interposed between the top run of the machine-frame and one of the balancing-wheel braces, substantially as described.

11. The combination with a bicycle, of a balancing-wheel arranged at one side of the machine and connected thereto by a suitable frame detachably connected to the machine-frame, a guiding-wheel located in advance of the steering-wheel of the machine and connected to the steering-fork by suitably-spaced bars, and a spring interposed between the frame and the steering-fork, whereby a pressure is exerted to maintain the guiding-wheel in engagement with the rail upon which the machine is traveling, substantially as described.

12. The combination with a bicycle, of a balancing-wheel arranged at one side thereof and connected to the machine-frame by one or more brace-rods, a guiding-wheel arranged in advance of the steering-wheel of the machine and connected to the machine-frame by spaced bars, and a spring interposed between the bars of the guiding-wheel and the machine-frame, substantially as and for the purpose described.

13. The combination with a bicycle, of a balancing-wheel, a frame connecting said wheel with the machine-frame, a guiding-wheel located in advance of the steering-wheel, an arm connecting said wheel with the steering-fork, a laterally-projecting spring on the steering-fork, and a flexible connection interposed between said spring and the machine-frame, substantially as described.

14. The combination with a bicycle, of a side balancing-wheel, one or more braces connecting said wheel with the machine-frame independent of the steering-wheel whereby to leave the steering-wheel free, a flanged guiding-wheel connected to the steering-wheel, and means for automatically controlling the guiding-wheel.

In testimony whereof I have signed this specification in the presence of two subscribing witnesses.

CHARLES EDWIN NICHOLS.

Witnesses:
 E. C. SHARP,
 L. L. TERPENING.